Sept. 27, 1938. H. LATELTIN ET AL 2,131,444
STEREOSCOPE
Filed Jan. 4, 1936 3 Sheets-Sheet 1
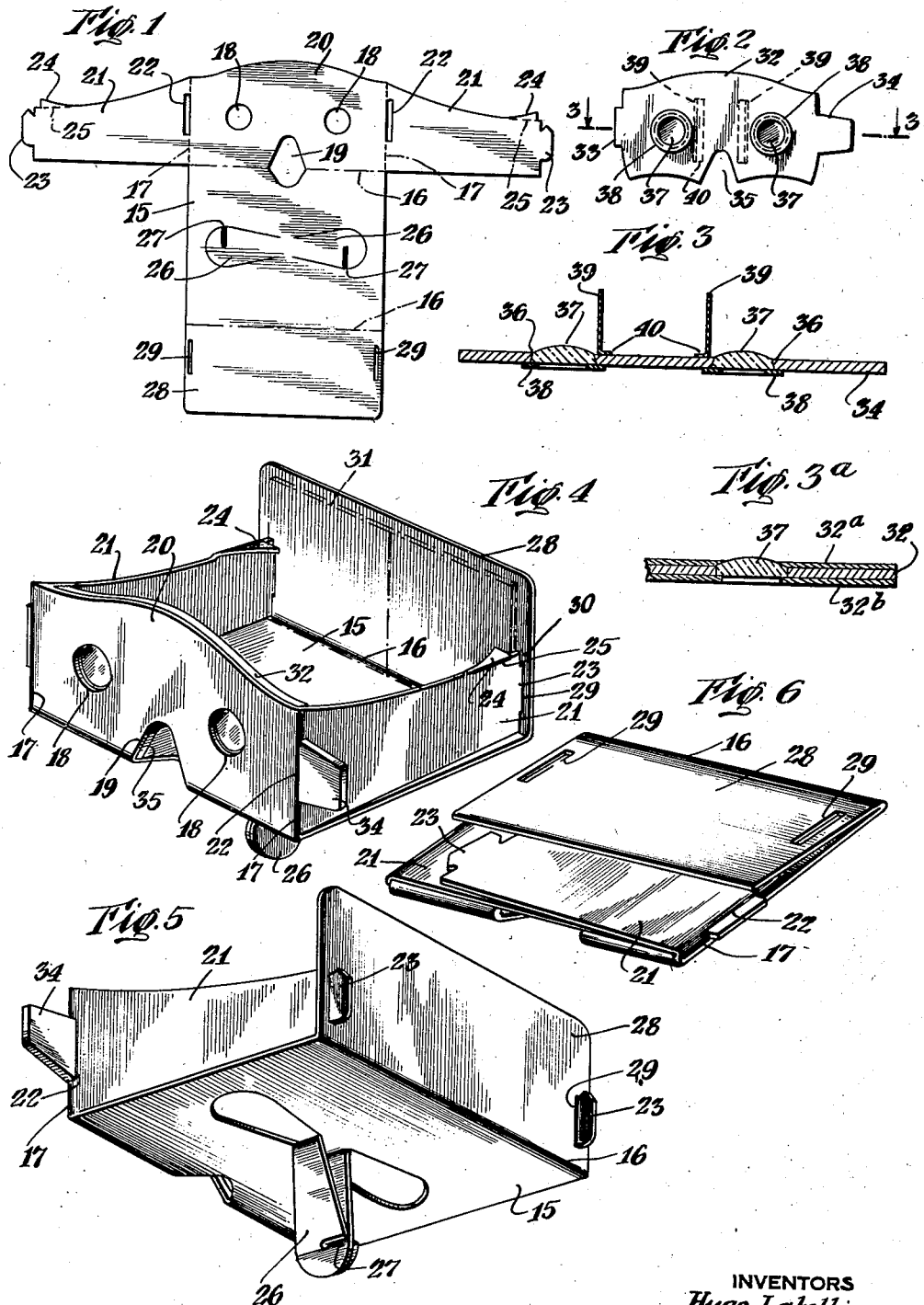
INVENTORS
Hugo Lateltin
BY Herman E. Bernhard
ATTORNEYS Sept. 27, 1938.　　　H. LATELTIN ET AL　　　2,131,444
STEREOSCOPE
Filed Jan. 4, 1936　　　3 Sheets-Sheet 2
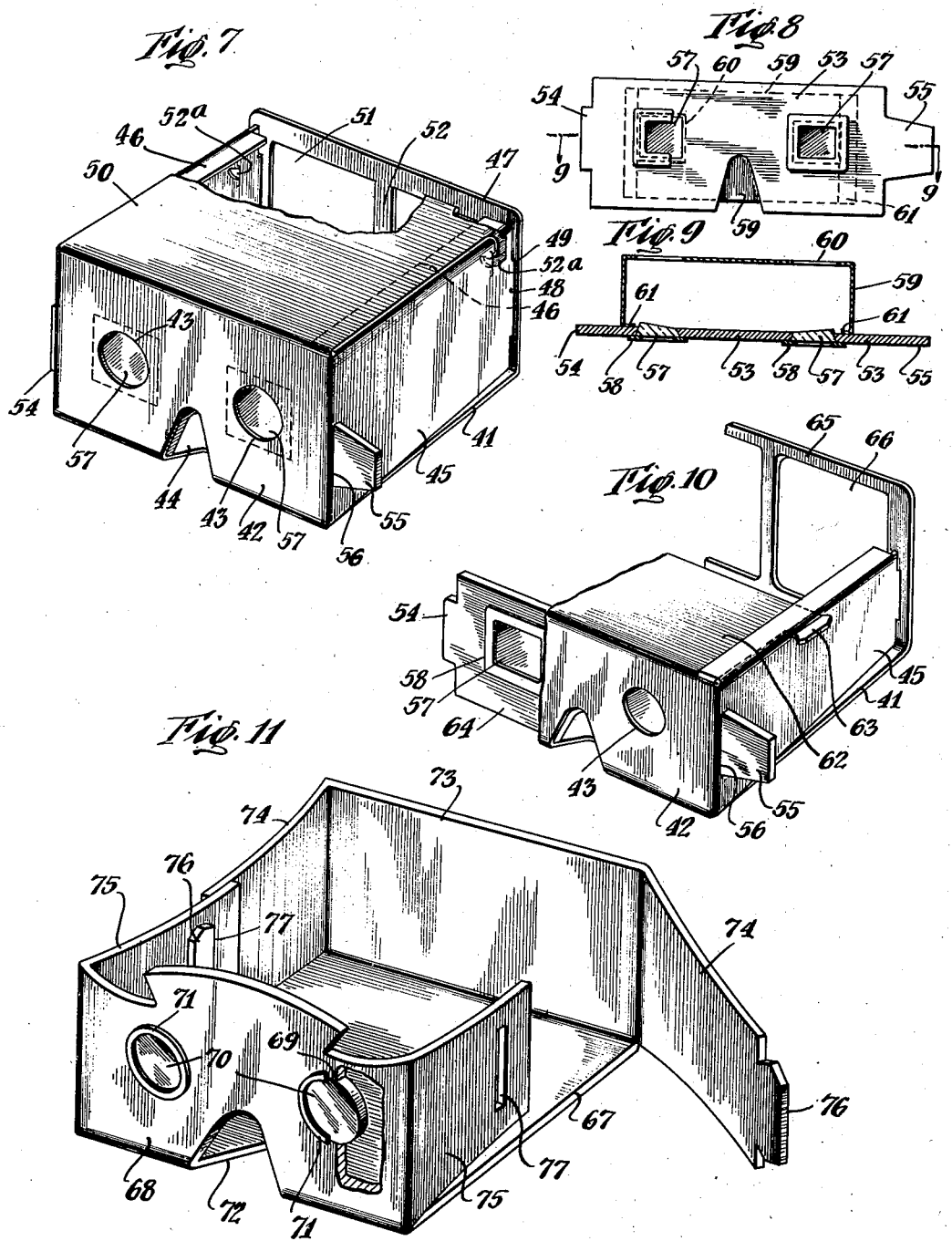
INVENTORS
*Hugo Lateltin*
BY *Herman E. Bernhard*
*Duell, Kane + Smoot*
ATTORNEYS

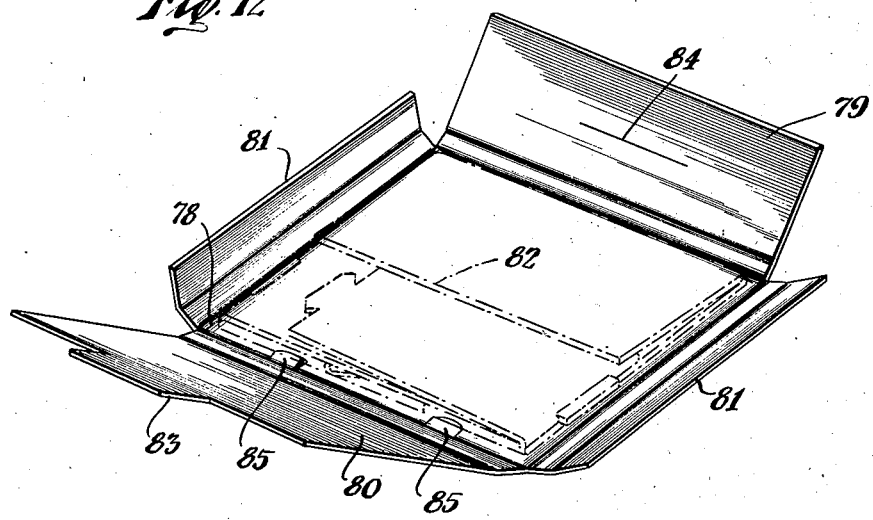
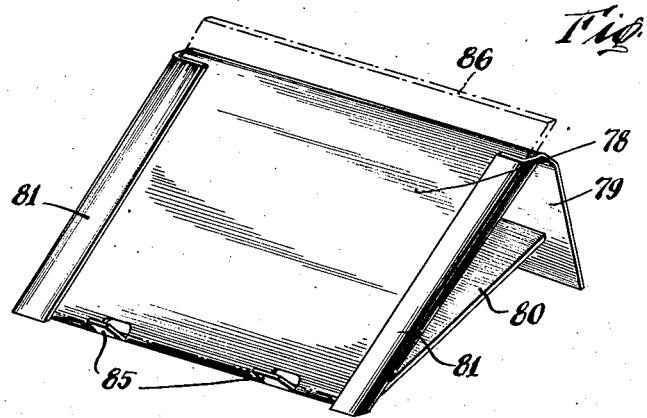
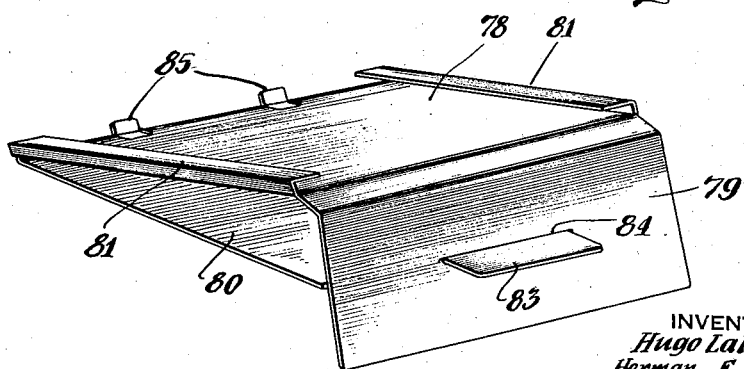

Patented Sept. 27, 1938

2,131,444

UNITED STATES PATENT OFFICE 2,131,444

STEREOSCOPE

Hugo Lateltin, New York, N. Y., and Herman E. Bernhard, Miami, Fla.

Application January 4, 1936, Serial No. 57,466

4 Claims. (Cl. 88—29)

This invention relates to improvements in a stereoscope.

It is an object of the invention to provide a device of this type, the body of which can be preformed of a single stamping and thereafter, by folding, be assembled and made ready for use.

Another object is that of providing a stereoscope having a universal focus and in which brilliant clear pictures may be viewed by the most casual or inexperienced user.

A still further object is that of providing a stereoscope in which the lens mounting is removable so that stereoscope type photographs appearing in books, magazines, or the like, can be viewed without resorting to the use of the holder.

Another object is that of providing a device of this type which when folded for shipment forms a natural protection for the lens elements and shields the latter from scratching or other damage.

A still further object is that of providing an envelope or package to receive said stereoscope and hold the same during shipment and which, when not put to such use, will serve as an easel or stand for photographs which may be viewed through the lens mount of the device independent of the holder.

With these and other objects in mind, reference is had to the accompanying sheets of drawings, in which:

Fig. 1 is a plan view of one type of stereoscope in disassembled position;

Fig. 2 is a plan view of one form of lens mount for use with the holder shown in Fig. 1;

Fig. 3 is a cross-section of said lens mount taken through the lines 3—3 of Fig. 2;

Fig. 3a is a fragmentary cross-section of a slightly modified lens mount;

Fig. 4 is a top perspective view of the holder in assembled position, showing the lens mount in place, while Fig. 5 is a bottom perspective view of the same holder, showing the handle member associated with the base thereof, and Fig. 6 is a further view of the holder shown in the preceding views as folded for shipment;

Fig. 7 is a perspective view of a modified form of holder in assembled position with a lens mount in place;

Fig. 8 is a plan view of a further form of lens mount, and

Fig. 9 is a cross-section of the lens mount shown in Fig. 8 and taken through the lines 9—9 thereof;

Fig. 10 is a partially broken away perspective view of a still further type of holder, and Fig. 11 is a perspective view of a holder formed with the lens mounting integral therewith;

Fig. 12 is a perspective view of an envelope or container having one type of folder positioned therein, and Figs. 13 and 14 are front and rear perspective views respectively of said folder in inverted position and serving as a stand or easel.

Referring now to Figs. 1 through 6, we have a stereoscope body blank 15 which may be formed of paper, cardboard, fibre, thin gauge metal, or any other like material. This blank is preferably stamped out of a continuous strip of material by means of a die and, if desired, may be preformed with weakened scoring lines 16 and 17 which will later serve as lines of fold. The blank is additionally formed with circular eye-accommodating apertures 18 and a nose-accommodating aperture 19 located in the face plate 20. Laterally extending side flaps 21 are positioned to either side of the face plate, and vertically extending slots 22 are located in each of said flap portions adjacent the lines of fold 17. The outer extremities of said flap portions are provided with tongues 23, and above each of said tongues and spaced inwardly therefrom are ear members 24 connected to said flap portions by weakened or scored lines 25. Handle forming portions 26 are struck out of the base of said holder and each of said handle portions is formed with an opposing slot 27 which cooperate with each other to hold the handle portions together when the device is assembled. The back or card holder 28 is likewise formed with vertically extending slot members 29, the latter being adapted to receive and hold the tongues 23 when the holder is assembled.

As is shown in Fig. 4, the ears 24 are spaced from the back wall 28 at 30 and so form a guiding means for positioning the card 31 bearing the pictures to be viewed through the device. The lens holder 32 is provided with a lug 33 adjacent one end and a handle portions 34 adjacent the other. These members cooperate with the slots 22 in the holder and, as shown in Figs. 4 and 5, serve as a means for keeping the lens mount in position. This mount, which is preferably of heavier material than the holder, may likewise be formed of paper, cardboard, fibre, metal, Bakelite, or the like, and has a nose-receiving aperture 35 which is complementary to the aperture 19 in the holder. Lens positioning apertures 36 are provided with inwardly tapering side walls and tapered lenses 37 are accommodated therein so that their outer surfaces are substantially flush with the outer surface of the mount. The lenses are thereafter secured against accidental displacement by means of paper or other suitable holding rings 38. Secured to the inner face of the mount and at the inner edge of each of said lenses is a masking or framing member 39 which extends vertically throughout the path of vision of the user. These members may be glued or otherwise secured to the mount at 40 and serve to prevent an overlap of vision when the device is in use.

The lens mount shown in Fig. 3a comprises three layers of board or paper glued or otherwise fastened together, the outer layers 32a and 32b overlapping the lens 37 and holding the same in position. The central strip 32 is preferably of the same thickness as the lens edges and slightly tapered so as to form a wedge fit to further hold the lens.

As will be seen, with particular reference to Figs. 4 and 5, the device is assembled by folding on the scored line 16 and thereafter folding the flaps 21 rearwardly on the fold lines 17 and inserting the tongues 23 in the slots 29. Handle portions 26 are thereafter folded downwardly and the opposing slots 27 fitted one inside the other. The lens mount is thereafter inserted so that the lug 33 and the handle 34 are received by the slots 22. The distance from the lens to the card holder at the rear of the device is set at a prearranged focus in the original planning of the device. The standard four inch focus has been found to work advantageously in this type of apparatus.

As shown in Fig. 6, when the stereoscope is folded for shipment the flaps 21 are folded in the opposite direction to that shown in Fig. 4 so that they form a cover or guard for the lenses and prevent damage or scratching of the latter; the back member 28 is folded last on top of the end flaps, and serves to hold them in place.

Referring now to Figs. 7 through 9, a modified type of holder is shown which is formed of a base 41, a face plate 42 formed with eye-accommodating apertures 43, and a nose-accommodating aperture 44. Side walls 45 extend rearwardly and have turned over top portions 46 to lend greater rigidity thereto. The side walls are secured to the back member 47 by means of tongues 48 which are accommodated by slots 49 in said back member. In this modification a top or cover member 50 is provided which extends rearwardly in contact with the side walls to a point just short of the back member 47, the spacing of these members being sufficient to permit the insertion or withdrawal of pictures or cards to be viewed. In this connection it will be noted that the back member is provided with two large openings 51 separated by a central strip 52 which acts as a brace or support to the structure. With the use of such a device, translucent pictures may be viewed by holding the device to the light. The cover member 50 may be secured to the side walls by means of a slot and tongue connection as shown at 52a or in any other suitable manner. As was described in connection with the earlier views, a lens mount 53 is provided having a positioning lug 54 and a handle 55 secured to opposite ends thereof. These cooperate with slot portions 56 formed in the side walls of the holder. In this modification the lens receiving apertures are square rather than circular, but have the same inwardly tapering characteristics as heretofore described. These, as has been shown, receive prismatic type lenses 57 which are likewise held in position by means of paper or other border strips 58 pasted against the outer surface of the mount and lens. Masking means 59 are provided in the form of a parallelogram which has apertures 60 spaced from the lenses and in line therewith, and which permit non-interfering rays of light to pass through the lenses and be seen by the user. This mask may be formed of paper or other suitable material and, as has been heretofore described, may be secured by gluing to the mounting as at 61. The mask just described as well as the one shown in Fig. 3 can, of course, be folded so as to lie in a plane adjacent the lens holder when the latter is shipped.

Fig. 10 shows a slightly modified form of the structure just described in which a top or cover portion 62 extends rearwardly only half the distance of the device and is secured at 63 by means of a tongue and groove connection as heretofore described. This structure is provided with a lens mount 64 and a rear wall 65 having openings 66 for use with translucent views. In providing a half cover member this form of viewer can be used with either opaque or translucent pictures as sufficient light can enter the device from in front to make them visible to the user.

In Fig. 11 a simple unitary structure is shown which, in common with the structure heretofore described, may be made of paper, cardboard, fibre, sheet metal, or the like, and which has a base 67 and a front plate 68, the latter being formed with lens accomodating apertures 69. Lenses 70 are secured therein by means of the tapered feature heretofore described in connection with the lens mounts shown in Figs. 2 and 8, and are held against accidental displacement by paper rings 71 secured to their outer edge. The usual nose aperture 72 is likewise provided. The back member 73 is provided with partially extending side flaps 74 which cooperate with side flaps 75 secured to the front plate. These are joined by means of tongues 76 and grooves 77 carried by the respective portions, and when assembled present a unitary structure. While this modification is rather limited in the uses to which it may be put, it presents one of the simplest and cheapest forms of the invention herein described, and is endowed with many of the same meritorious characteristics generic in the other forms.

In Figs. 12 through 14, a combination package and easel are shown for use in connection with the structure heretofore described. This package is formed of material similar to that of which the holder itself is formed, and has a back 78 and two cover flaps 79 and 80. Side flaps 81 are likewise provided and these latter fold inwardly on the disassembled holder which is shown schematically at 82. Thereafter the flap 79 is folded downwardly and then the flap 80 with its tongue 83 is folded on top of the flap 79 and the tongue inserted in the opening 84 thereof. When used as a stand or easel the package flaps 79 and 80 are folded outwardly instead of inwardly and assembled in such condition so that the article takes the position shown in Figs. 13 and 14. At this point stops 85 which are struck out of the back may be bent into position and a card 86 can then be inserted in the stand and be available for viewing, independent of the holder, by a user simply holding the lens mount. Use of the stand over the holder is preferred by certain users and when mastered lends itself to a more expeditious viewing of a number of subjects.

Thus, among others, the several objects of the invention as afore noted are achieved. It will be appreciated, as afore brought out, that numerous changes in construction and rearrangement of the parts might be resorted to without departing from the spirit of the invention as defined by the claims.

Having thus described the invention, what is claimed is:

1. A stereoscope comprising a body including a front wall, a base extending rearwardly therefrom, side walls connected to said front wall and also extending rearwardly therefrom, a rear wall extending upwardly from said base, said side walls being formed with slots at points adjacent the front wall, a lens mounting member disposed between said side walls and adjacent said front wall, and extensions forming a part of said member and projecting through said slots whereby to secure said member against movement with respect to said front wall, and said front member and base being formed with cut-out portions to accommodate the nose of the user.

2. A stereoscope comprising a body including a front wall, a base extending rearwardly therefrom, side walls connected to said front wall and also extending rearwardly therefrom, a rear wall extending upwardly from said base, said side walls being formed with slots at points adjacent the front wall, a lens mounting member disposed between said side walls and adjacent said front wall, and extensions forming a part of said member and projecting through said slots whereby to secure said member against movement with respect to said front wall and one of said extensions projecting beyond said side wall to a point such that it may provide a sidewise projecting handle to be grasped by the user.

3. A stereoscope comprising a body including a front wall, a base extending rearwardly therefrom, side walls connected to said front wall and also extending rearwardly therefrom, a rear wall extending upwardly from said base, said side walls being formed with slots at points adjacent the front wall, a lens mounting member disposed between said side walls and adjacent said front wall, and extensions forming a part of said member and projecting through said slots whereby to secure said member against movement with respect to said front wall, one of said extensions projecting beyond said side wall to a point such that it may provide a sidewise projecting handle to be grasped by the user, and extensions integral with the base and projecting downwardly therefrom to furnish a second and correspondingly extending handle.

4. A stereoscope including a body comprising a front wall formed with sight openings, a base extending rearwardly therefrom, means supported by said base for mounting an illustration to be viewed, side walls connected to said front wall and being formed with slots at points adjacent said front wall, a lens mounting, also disposed adjacent said front wall and between said side walls, lugs extending from said mounting and through the slots in said side walls to secure the former against movement with respect to said walls, and one of said lugs projecting materially beyond the side wall through which it extends, whereby to provide a supporting handle for said stereoscope.

HUGO LATELTIN.
HERMAN E. BERNHARD.